(12) United States Patent
Poornachandran et al.

(10) Patent No.: US 9,779,399 B2
(45) Date of Patent: Oct. 3, 2017

(54) MULTI USER ELECTRONIC WALLET AND MANAGEMENT THEREOF

(75) Inventors: Rajesh Poornachandran, Portland, OR (US); Gyan Prakash, Beaverton, OR (US); Shahrokh Shahidzadeh, Portland, OR (US); Selim Aissi, Beaverton, OR (US); Ravikiran Chukka, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 684 days.

(21) Appl. No.: 13/997,264

(22) PCT Filed: Dec. 22, 2011

(86) PCT No.: PCT/US2011/066742
§ 371 (c)(1),
(2), (4) Date: Mar. 14, 2014

(87) PCT Pub. No.: WO2013/095486
PCT Pub. Date: Jun. 27, 2013

(65) Prior Publication Data
US 2014/0188719 A1    Jul. 3, 2014

(51) Int. Cl.
*G06Q 20/00*    (2012.01)
*G06Q 20/36*    (2012.01)
*G06Q 20/32*    (2012.01)

(52) U.S. Cl.
CPC ..... *G06Q 20/3674* (2013.01); *G06Q 20/3226* (2013.01); *G06Q 20/36* (2013.01)

(58) Field of Classification Search
USPC .......... 705/16, 21, 59, 71; 380/44, 262, 278, 380/279
See application file for complete search history.

(56) References Cited

U.S. PATENT DOCUMENTS

| 6,862,575 B1 | 3/2005 | Anttila et al. |
| 7,233,926 B2 | 6/2007 | Durand et al. |
| 7,373,509 B2 | 5/2008 | Aissi et al. |
| 8,108,318 B2 | 1/2012 | Mardikar |
| 2001/0027441 A1 | 10/2001 | Wankmueller |

(Continued)

FOREIGN PATENT DOCUMENTS

| CN | 1312510 A | 9/2001 |
| CN | 1700222 A | 11/2005 |

(Continued)

OTHER PUBLICATIONS

China Office Action from related China Application 201180075773.0 dated Jun. 24, 2016.

(Continued)

*Primary Examiner* — Dante Ravetti
(74) *Attorney, Agent, or Firm* — Grossman, Tucker, Perreault & Pfleger, PLLC

(57) ABSTRACT

Systems and methods for sharing an e-wallet are disclosed. In some embodiments, the systems and methods may share an e-wallet among multiple users on a single device. In other embodiments, the systems and method may share an e-wallet among multiple devices and/or multiple users on multiple devices. In some instances, a remotely stored e-wallet may be used or leveraged by an e-wallet uncertified device.

15 Claims, 10 Drawing Sheets

(56) References Cited

U.S. PATENT DOCUMENTS

| | | | |
|---|---|---|---|
| 2001/0034719 | A1 | 10/2001 | Durand et al. |
| 2009/0005000 | A1* | 1/2009 | Baker .................. G06Q 10/103 455/405 |
| 2009/0094134 | A1* | 4/2009 | Toomer .................. G06Q 10/10 705/26.1 |
| 2010/0114731 | A1 | 5/2010 | Kingston et al. |
| 2011/0078081 | A1 | 3/2011 | Pirzadeh et al. |
| 2011/0289004 | A1 | 11/2011 | Prakash et al. |
| 2012/0296819 | A1 | 11/2012 | Lu et al. |
| 2013/0340034 | A1 | 12/2013 | Rich et al. |

FOREIGN PATENT DOCUMENTS

| | | |
|---|---|---|
| EP | 1132876 A2 | 9/2001 |
| EP | 1132876 A3 | 5/2002 |
| JP | 2010-257060 A | 11/2010 |
| KR | 10-2004-0093753 A | 11/2004 |
| KR | 10-2005-0092532 A | 9/2005 |
| KR | 10-2010-0119325 A | 11/2010 |
| TW | 201033912 A | 9/2010 |
| WO | 20131048426 A1 | 4/2013 |

OTHER PUBLICATIONS

European Search Report from related European Applicationi 11878284.6 dated May 29, 2015.
EMV Mobile Contactless Payment, Technical Issue and Position Paper, Version 1.0, Oct. 2007.
Hussin, et al., "E-Pass Using DRM in Symbian v8 OS and TrustZone: Securing Vital Data on Mobile Devices", Department of Communications Systems, Lancaster University, International Conference on IEEE Computer Society US, 1 Jun. 1, 2006.
International Preliminary Report on Patentability and Written Opinion received for PCT Patent Application No. PCT/US2011/054139, mailed on Apr. 10, 2014, 6 Pages.
International Preliminary Report on Patentability and Written Opinion received for PCT Patent Application No. PCT/US2011/066742, mailed on Jul. 3, 2014, 5 Pages.
Office Action received for Taiwanese Patent Application No. 101148756, mailed on Sep. 9, 2014, 3 pages of English Translation and 3 pages of Office Action.
International Search Report and Written Opinion received for PCT Patent Application No. PCT /US2011/066742, mailed on Aug. 28, 2012, 8 pages.
International Search Report received for PCT Patent Application No. PCT/US2011/054139, mailed on May 15, 2012, 2 pages.
Chinese Office Action issued in Chinese Application No. 201180075773.0, dated Jan. 18, 2017, with English translation.
Chinese Office Action issued in Chinese Application No. 201180075773.0, dated Jul. 3, 2017, with English machine translation, 25 pages.

* cited by examiner

MULTI USER ELECTRONIC WALLET AND MANAGEMENT THEREOF

FIELD

The present disclosure relates to electronic wallets and the management thereof.

BACKGROUND

Recently, interest has increased in mobile and electronic commerce. In view of this trend, systems and applications have been developed that enable consumers to conduct transactions without the use of a physical payment medium such as for example cash, credit cards, gift cards, and coupons. One such solution is the so-called electronic wallet, hereinafter referred to as "e-wallet."

In general, an e-wallet is an electronic payment system that allows a consumer to store payment information such as for example his or her bank account and routing information, credit card information, and so forth on an electronic device. Once this information is stored in the e-wallet, the consumer (e.g., the e-wallet owner) can use the electronic device including the e-wallet to make purchases online, in retail outlets, and/or in other locations. As result, the consumer can complete online and/or point of sale transactions without the use of a physical payment medium.

While existing e-wallet solutions are useful, they do not include a mechanism that allows an e-wallet to be shared and managed among multiple users and/or multiple devices. Moreover, existing e-wallet solutions do not address various challenges associated with managing and/or synchronizing an e-wallet that is shared in this manner.

DETAILED DESCRIPTION

Figure 1:
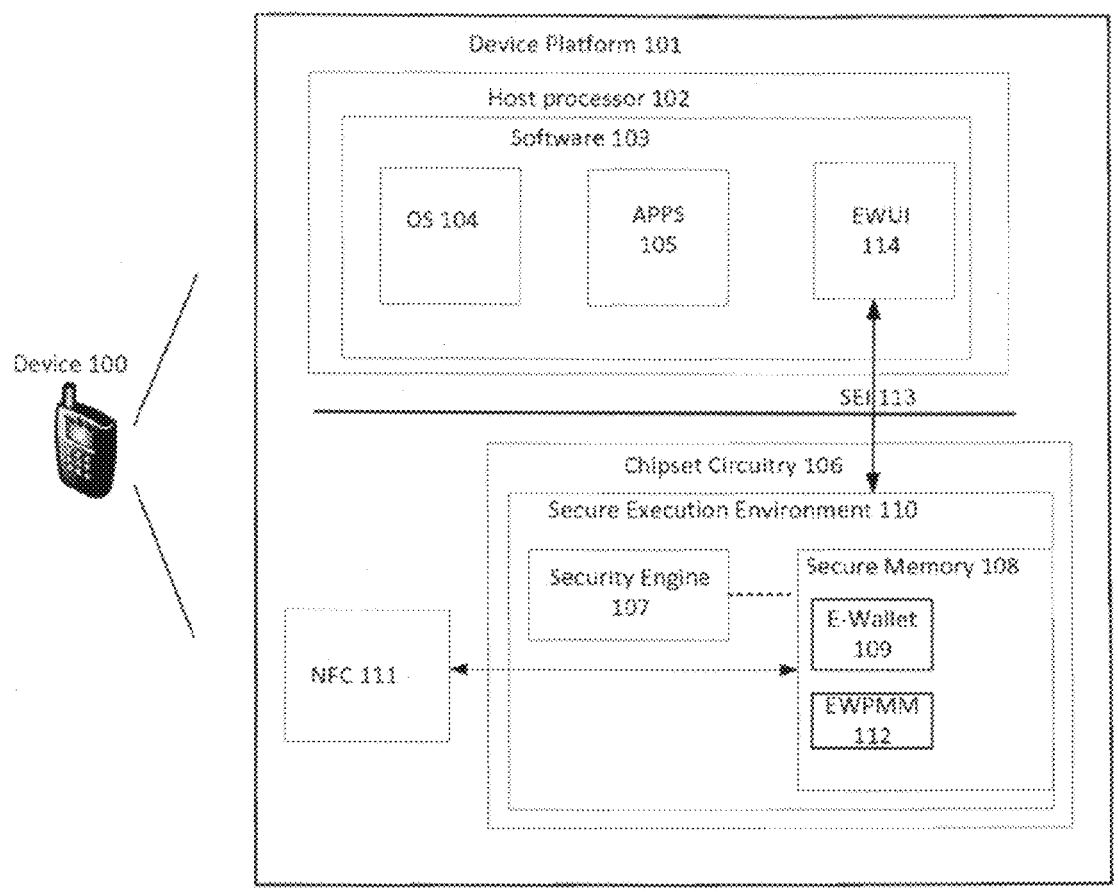
FIG. 1 depicts exemplary system architecture of a device including a secure execution environment and an e-wallet, consistent with non-limiting embodiments of the present disclosure.

As briefly described in the background, an e-wallet is an electronic payment system that can allow a consumer to conduct online and/or point of sale transactions without using a physical payment medium. E-wallets often take the form of an e-wallet application that includes libraries or other mechanisms for storing financial information in a secure manner. As non-limiting examples of such financial information, mention is made of credit card information, bank account information (including bank account and routing numbers), brokerage account information, gift card information, coupon card information, other financial information, and combinations thereof. Of course, such examples are exemplary only, and other information (financial or otherwise) may be stored within an e-wallet.

The e-wallets described herein may be provisioned within one or more electronic devices. As non-limiting examples of such electronic devices, mention is made of mobile devices such as but not limited to cell phones, electronic readers, handheld game consoles, mobile internet devices, portable media players, personal digital assistants, smart phones, tablet personal computers, ultra-mobile personal computers, netbooks, and notebook computers. Further non-limiting examples of electronic devices that may be used in accordance with the present disclosure include automated teller machines (ATM's), desktop computers, kiosks, payment terminals, public computer terminals, and wired telephones (including but not limited to internet enabled telephones).

As used herein, the term "e-wallet certified device" means an electronic device that includes secure storage in which an e-wallet is stored and executed in a secure execution environment. In addition, such devices comply with one or more security standards for the protection of financial information. Non-limiting examples of such security standards include the payment application data security standard (PA-DSS), the payment card industry data security standard (PCI-DSS), and the global platform security standard (GP-SS; including but not limited to GP-SS 2.2). Of course, such data security standards are exemplary only, and the present disclosure contemplates devices that are certified to comply with other data security standards that may presently or in the future be implemented to protect stored financial information.

As used herein, the term, "e-wallet uncertified electronic device" means an electronic device that is not certified to store and/or run an e-wallet or may not be complaint with specific standards not limiting to the above mentioned. In some embodiments, and as will be described in detail below, an e-wallet uncertified electronic device may be capable of executing programs and/or performing operations within a secure execution environment as defined above. Thus, for example, such devices may include secure storage and/or a security engine as described above.

The e-wallet certified and uncertified devices described herein may also include at least one interface that is operable to allow communications to be sent and received. While the present disclosure frequently makes reference to devices that are capable of communicating e-wallet information via near field communication (NFC), it should be understood that other interfaces may be used. For example, the e-wallet certified and uncertified devices described herein include or be coupled to a wireless transceiver such as but not limited to a near field communication (NFC) controller, a radio frequency transceiver, a wireless local area network (WLAN) transceiver, a personal area network (PAN) transceiver, an ultra-wideband network (UWBN) transceiver, or a combination thereof. In some embodiments, the devices described herein include or are coupled to an interface that is capable of communicating with a transaction server. As non-limiting examples of such a transaction server, mention is made of online payment servers, point of sale terminals, and combinations thereof.

As used herein, the term "secure storage" means a memory that is isolated or otherwise inaccessible to a host processor of an electronic device, an operating system of such a device, and/or a basic input output system (BIOS) of such a device.

As used herein, the term "secure execution environment" means a combination of hardware and/or software resources that are isolated or otherwise inaccessible to a host processor, an operating system (OS), and or a basic input output system (BIOS) of an electronic device. In some embodiments, a secure execution environment may be provided by enforcing a read only policy on data blocks within secure storage. Such a read only policy may be enforced, for example, by a security engine (e.g., an embedded microcontroller) within a chipset of the electronic device. In some instances, the security engine is also isolated or otherwise inaccessible to the host processor, OS, and/or BIOS of an electronic device. Programs, modules, and the like may be executed within the secure execution environment by storing and running them from within secure storage.

From time to time, the present disclosure may describe one or more software components that may be utilized in association with present disclosure. In many instances, it is noted that such software components may take the form of a computer readable medium having instructions stored thereon which when executed by a processor cause the processor to perform functions associated with the software component. While such implementation may or may not be preferred, it should be understood that any of the software components described herein may be implemented in another manner. For example, such components may take the form of hard coded logic, a hardware processor, one or more software modules, and the like.

FIG. 1 depicts exemplary system architecture of electronic device 100 (hereafter, device 100) that is consistent with non-limiting embodiments of the present disclosure. As shown, device 100 includes device platform 101. For the sake of illustration only, device 100 is depicted in FIG. 1 as a mobile phone and thus, device platform 101 may correlate to a mobile phone platform. However, it should be understood that device platform 101 may take another form. As non-limiting examples of device platforms that may be used as device platform 101, mention is made of cell phone platforms, electronic reader platforms, handheld game console platforms, mobile internet device platforms, portable media player platforms, personal digital assistant platforms, smart phone platforms, tablet personal computer platforms, ultra-mobile personal computer platforms, netbook and notebook computer platforms, automated teller machine (ATM) platforms, desktop computer platforms, kiosk platforms, payment terminal platforms, public computer terminal platforms, and wired telephone platforms. In some embodiments, device platform 101 is a cell phone platform, a portable media platform, a smart phone platform, a tablet personal computer platform, a netbook platform, or a notebook computer platform.

Device platform 101 includes host processor 102. Without limitation, host processor 102 may execute software 103, such as but not limited to operating system (OS) 104, and applications (APPS) 105. Device platform 101 also includes chipset circuitry 106. Chipset circuitry 106 may include integrated circuit chips such as, for example, those selected from integrated circuit chipsets commercially available from Intel Corporation, although other integrated circuit chips may also or alternatively be used. "Circuitry", as used in any embodiment herein, may comprise, for example, singly or in any combination, hardwired circuitry, programmable circuitry, state machine circuitry, and/or firmware that stores instructions executed by programmable circuitry.

In some embodiments, chipset circuitry 106 includes security engine 107 and at least one secure memory 108. Security engine 107 may be, for example, a microcontroller that is embedded within chipset circuitry 106 in such a manner that it is isolated or otherwise inaccessible to host processor 102, OS 104, and/or a BIOS of device 100. Accordingly, security engine 107 and its underlying code (e.g., firmware or software) may be implemented and/or executed in an environment that is isolated from or otherwise inaccessible to host processor 102, OS 104, and/or a basic input operating system (BIOS) (not shown in FIG. 1) of device 100.

In some embodiments, the software and/or firmware of security engine 107 may be executed from a portion of secure memory 108 that is protected from host processor 102, OS 104 and/or a BIOS of device 100. For example, the software and/or firmware of security engine 107 may be stored within data storage blocks of secure memory 108 that are hidden or otherwise inaccessible to host processor 102, OS 104, or a BIOS of device 100. In some instances, such data blocks may be protected by a read only policy, such as, for example a read only policy enforced by security engine 107 and/or by a unified memory access (UMA) mechanism that prevents direct access to such blocks by unauthorized software running on host processor 102. Such unauthorized software may include, for example, all or a portion of software 103, such as but not limited to APPS 105 and OS 104. Data storage blocks of secure memory 108 that are secured in this manner may be considered secure storage that is suitable for storing an e-wallet.

The combination of secure storage and security engine 107 may be considered a secure execution environment, as defined above, and is depicted in FIG. 1 as secure execution environment 110. Thus, it should be understood that secure execution environment 110 may be a hardware block of chipset circuitry 106 that includes security engine 107 and secure storage (i.e. secured data blocks of secure memory 108).

Secure Memory 108 may include one or more of the following types of memory: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Additionally or alternatively, secure memory 108 may include other and/or later-developed types of computer-readable memory. In some embodiments, secure memory 108 is local to host processor 102, local to security engine 107, and/or local to another embedded processor (not shown) within chipset circuitry 106.

In some embodiments, device 100 and components thereof (e.g., secure execution environment 110, memory 108, security engine 107, etc.) may be certified to comply with one or more security standards for the protection of secure financial information, as previously described. In such instances, device 100 may be considered an e-wallet certified device. In contrast, if device 100 is not certified to comply with such security standards, device 100 may be considered an e-wallet uncertified electronic device.

If device 100 is e-wallet certified, e-wallet 109 may be stored and executed within secure execution environment 110. Accordingly, e-wallet 109 can be isolated or otherwise inaccessible to host processor 102, all or a portion of software 103 (including but not limited to OS 104 and APPS 105), and/or a BIOS of device [not shown in FIG. 1] 100. E-wallet 109 can also be stored within data blocks of secure memory 108 that are protected by a read only policy, such as, for example, a read only policy enforced by security engine 107 and/or by a unified memory access (UMA) mechanism, as previously described.

As may be appreciated, e-wallet 109 may take the form of instructions stored on a computer readable medium, which when executed by a processor cause the processor to perform e-wallet operations consistent with those described in the present disclosure. For example, in the non-limiting example of FIG. 1, e-wallet 109 when executed may can cause a processor to communicate with near field communications (NFC) controller 111, which in turn can communicate with devices external to device 100.

NFC is a wireless technology that can transmit data at a variety of data rates over short distances, such as but not limited to greater than 0 to about 50 cm. NFC may operate in one of three operating modes, namely read/write mode, peer to peer mode, and card emulation mode. While any of these modes may be useful to facilitate e-wallet transactions, card emulation mode is preferred because it can enable a payment system such as, for example, a point of sale terminal to access information within the e-wallet over the NFC interface. Thus, in some embodiments of the present disclosure NFC 111 operates in card emulation mode. In such mode, NFC controller 111 may operate on power received from device 100. NFC controller 111 may also be capable of operating even when device 100 is turned off, e.g., by using radio frequency (RF) power in a manner similar to radio frequency identification (RFID) based devices.

Without limitation, NFC 111 may include or be implemented by a card virtual machine, such as, for example, a java card virtual machine. When used, such card virtual machine may comply with one or more data security standards for the protection of financial information, including without limitation the global platform security standard (GP-SS), such as for example but not limited to GP-SS version 2.2. Of course, GP-SS compliance is not required, and the card virtual machine may comply with other security standards.

In the non-limiting example of FIG. 1, secure memory 108 may have an e-wallet policy management module (EWPMM) 112 stored thereon. As will be described in detail below, EWPMM 112 can provide a mechanism for sharing e-wallet policies and user profiles associated with e-wallet 109 amongst multiple users on a single electronic device, amongst multiple electronic devices, and amongst multiple users on multiple electronic devices. Like security engine 107 and e-wallet 109, EWPMM 112 may also be stored within and executed from data blocks of secure memory 108 that are protected by read only policy, as previously described. In this way, EWPMM 112 may be isolated or otherwise inaccessible to host processor 102, all or a portion of software 103 (including but not limited to OS 104 and APPS 105, and/or a BIOS of device [not shown in FIG. 1] 100.

While EWPMM 112 is shown in FIG. 1 as being stored within secure execution environment 110 on device 100, storage and execution of an EWPMM in that location is not required. Indeed, the present disclosure contemplates systems and methods wherein an EWPMM may be stored and executed in a variety of locations. For example, an EWPMM and/or components thereof may be resident as an application on one or more electronic devices (e.g., as shown in FIGS. 1 and 4B), within network storage (e.g., a cloud server), and combinations thereof. In some embodiments, an EWPMM or one or more components thereof is/are stored within secure storage of an e-wallet certified device; within a secure execution environment of a e-wallet uncertified electronic device; within network storage (e.g., an internet server) that may be e-wallet certified or e-wallet uncertified; and combinations thereof.

Although security engine 107, e-wallet 109 and EWPMM 112 can be executed in secure execution environment 110, inputs to such elements may be made through authorized software executed by host processor 102. To facilitate such communication, device platform 101 may include one or more secure execution environment interface 113 (SEI 113) that allows secure inputs to be made to security engine 107, e-wallet 109, and/or EWPMM 112. As non-limiting examples of interfaces that may be used as SEI 113, mention is made of secure buses, such as but not limited to an inter integrated circuit (IIC or I2C) bus.

In some embodiments therefore, software 103 can include e-wallet user interface 114 (EWUI 114) that is operable to communicate, via SEI 113, with components of secure execution environment 110, such as security engine 107, e-wallet 109, and/or EWPMM 112. EWUI 114 may therefore be executed by host processor 102 as an independent application on device platform 101. Alternatively, EWUI 114 may be configured as an application that is run within the context of other software executed by host processor 102. For example, EWUI 114 may be an application that is run within OS 104. Likewise, EWUI 114 may be a web-based interface, including without limitation a web application run within a host web browser, and/or website code that is executed and/or read by a web browser. In such instances, EWUI 114 may be understood to be a web-based electronic wallet user interface. Regardless of its nature, EWUI 114 may be understood to provide an interface through which one or more users of device 100 may initiate an e-wallet transaction and/or provide inputs to security engine 107, e-wallet 109 and/or EWPMM 112.

One aspect of the present disclosure relates to systems and methods for sharing an e-wallet among multiple users on a single device. In this regard, the systems and methods of the present disclosure can utilize an electronic wallet policy management module (EWPMM) such as for example EWPMM 112 in FIG. 1 to establish one or more e-wallet policies and user profiles. As described previously, an EWPMM or components thereof may be provisioned within a secure execution environment of an electronic device, as shown in FIG. 1. Alternatively, an EWPMM may be provisioned remotely from a user, e.g., within network storage such as but not limited to a network server (e.g., an internet (cloud) server).

Regardless of its location, an EWPMM may be implemented as a computer readable medium with instructions stored thereon which when executed by a processor cause the processor to perform user profile and e-wallet policy setup and/or management operations consistent with the present disclosure. Once EWPMM is provisioned (on an e-wallet certified device or otherwise), it may be used to establish one or more policies for the management of an e-wallet (hereafter, "e-wallet policies). In this regard, a given user of an e-wallet (e.g., the e-wallet owner) may, after being appropriately authenticated, be allowed to create an administrator account associated with the e-wallet. Such an administrator account may be a primary account that is capable of establishing, via an EWPMM, one or more e-wallet policies. For example, the administrator account may establish a global e-wallet policy that affects the use of payment types stored within an e-wallet. Alternatively or additionally, the administrator account may establish e-wallet policies that affect one or a subset of the payment types stored within an e-wallet.

The e-wallet policies described herein can include controls that govern access to and/or the use of payment types that are stored within an e-wallet. Non-limiting examples of such controls include limits on the number of transactions that may be performed with a payment type, limits on the dollar amount per/transaction, transaction type limits (e.g., online, point of sale, etc.), geographic limitations (e.g., e-wallet use limited to particular geographic area which may be tracked dynamically, such as, for example, with a global positioning system within an e-wallet certified or uncertified device), other controls, and combinations thereof.

In addition, an EWPMM may be used to create one or more user profiles. As may be appreciated, such user profiles may be affiliated with individuals that are authorized to access and/or use one or more of the payment types stored in an e-wallet. Such user profiles may be created, for example, by the administrator account, a user of an e-wallet associated with the administrator account, a trusted service manager (TSM) such as but not limited to a financial institution associated with the e-wallet, and combinations thereof.

Generally, the user profiles described herein contain information that is sufficient to securely identify and authenticate a user of an e-wallet. Thus, for example, such user profiles may include identifying indicia such as but not limited to a username, password, secure image, user age information, user location information, the international mobile equipment identity of the user's electronic device, trusted platform module (TMP) tokens, other identifying indicia, and combinations thereof.

The user profiles described herein may also include security indicia. As examples of such security indicia, non-limiting mention is made of keys (e.g., public keys), cipher information (e.g., data encryption standard (DES), Triple data encryption standard (3DES), advanced encryption standard (e.g., AES-128, AES-192, AES-256), Rivest Cipher (RC), Kasumi, etc.), encrypted data, hash information (e.g., message digest (e.g., MD4), secure hash information (e.g., secure hash algorithm 1 (SHA-1), secure hash algorithm-X (SHA-X), hash based message authentication codes (HMACs) etc.), combinations thereof, and other indicia. As may be appreciated, such indicia may be useful to secure data communications in embodiments where an e-wallet is shared between multiple devices, such as but not limited to between an e-wallet certified device and an e-wallet uncertified electronic device. In some embodiments, the security indicia may constitute a shared secret between one or more electronic devices.

The identifying information and/or security indicia described above may individually or collectively constitute credentials that may serve to authenticate a user of an e-electronic wallet to a system, such as, for example, an e-wallet certified or uncertified electronic device, a remote authentication server, and the like. Accordingly, such credentials may be in one or more authentication operations that can serve to identify or otherwise validate a user that initiates the e-wallet transaction. In some embodiments, such authentication operations involve comparing credentials supplied by a user that initiates an e-wallet transaction to credentials associated with e-wallet policies and user profiles associated with an e-wallet. Alternatively or additionally, such authentication operations may involve so-called remote attestation, in which a remote authentication server may be used to validate the identity of a user and a device initiating an e-wallet transaction. As may be appreciated, such a process may facilitate the identification and use of an appropriate user profile and/or e-wallet profile for a proposed e-wallet transaction.

In addition to identifying and/or security indicia, the user profiles described herein may include one or more controls that are associated with any or all of the various payment types stored within an e-wallet. Such controls may be the same or different from the controls discussed above with respect to an e-wallet policy. That is, the controls in the user profiles described herein may include limits on the number of transactions that may be performed with a payment type, limits on the dollar amount per/transaction, transaction type limits (e.g., online, point of sale, etc.), geographic limitations, other controls, and combinations thereof. In this way, the user profiles disclosed herein can enable user specific controls to be implemented that govern the access to and use of one or more payment types in an e-wallet.

Figure 2A:
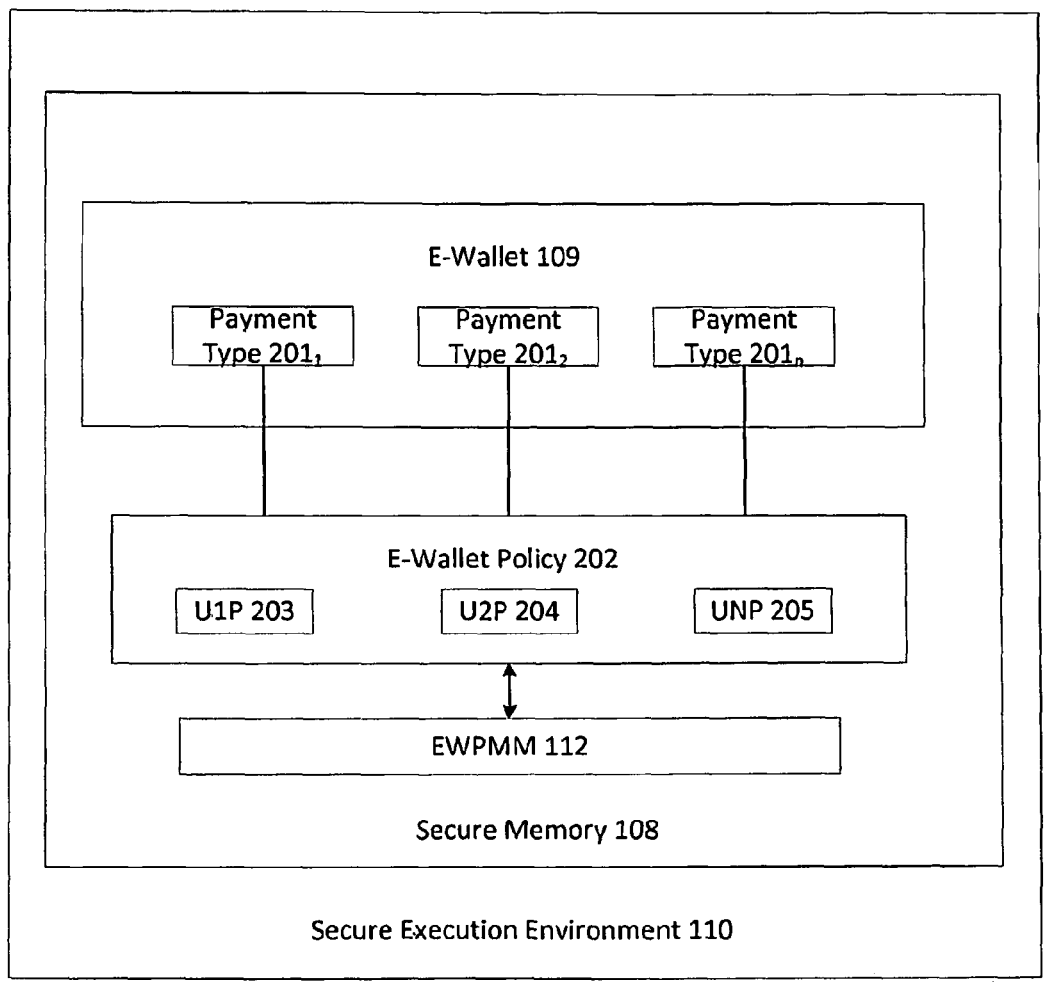
FIG. 2A depicts a secure execution environment including a global e-wallet policy and multiple user profiles in accordance with non-limiting embodiments of the present disclosure.
Figure 2B:
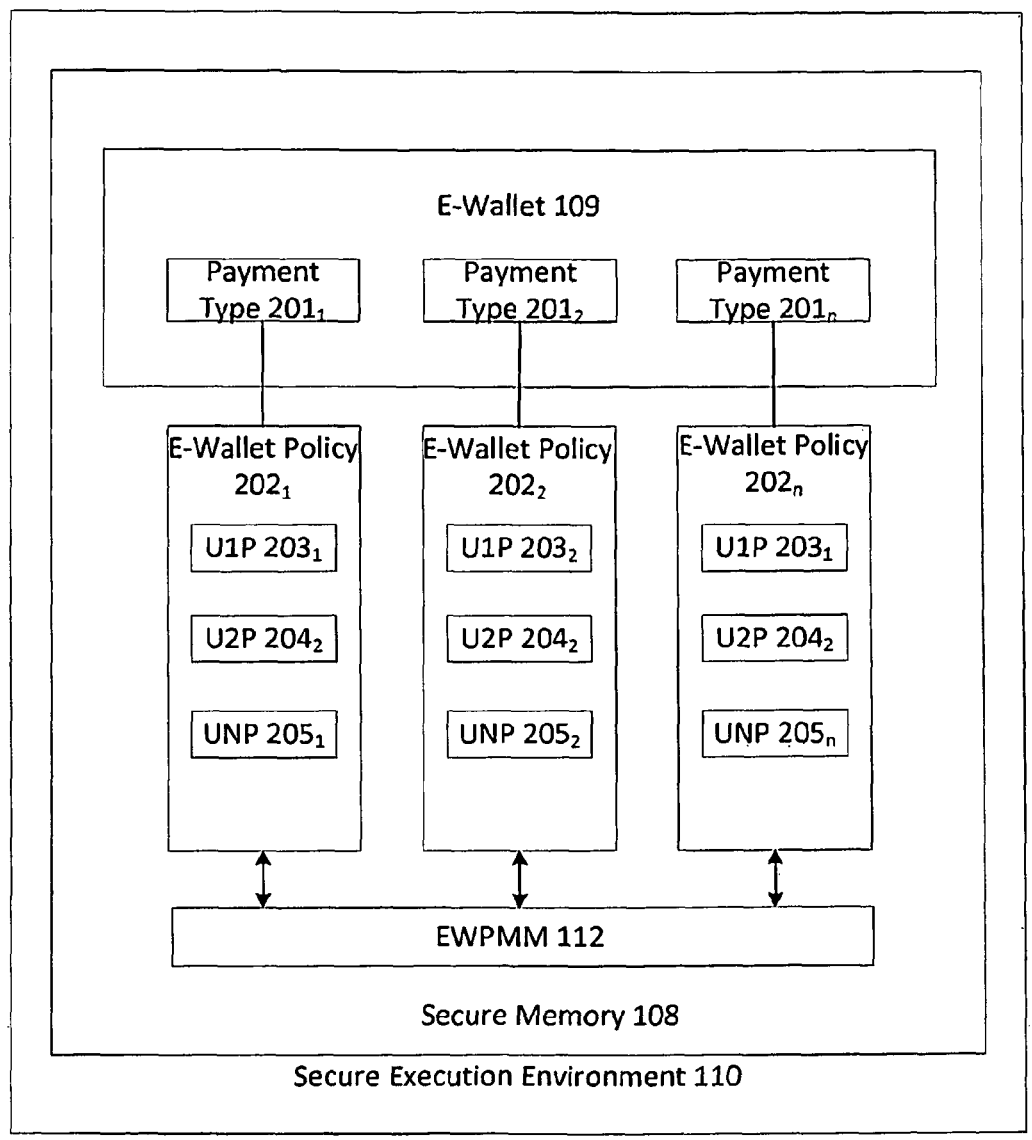
FIG. 2B depicts a secure execution environment including payment type specific e-wallet policies and multiple user profiles in accordance with non-limiting embodiments of the present disclosure.

As illustrations of the use of e-wallet profiles and user profiles in accordance with non-limiting embodiments of the present disclosure, reference is made to FIGS. 2A and 2B. In the non-limiting example shown in FIG. 2A, secure execution environment 110 includes secure memory 108, which in turn includes e-wallet 109 and EWPMM 112. Three payment types $201_1$, $201_2$, and $201_n$ are associated with e-wallet 109. In this non-limiting embodiment, EWPMM 112 has established e-wallet policy 202, which globally applies to each of payment types $201_1$, $201_2$, and $201_n$. As previously described, e-wallet policy 202 may include controls that regulate access to and the use of payment types $201_1$, $201_2$, and $201_n$.

In addition to e-wallet policy 202, EWPMM has established user 1 profile (U1P) 203, user 2 profile (U2P) 204, and user n profile (UNP) 205. Each of these user profiles may be associated with one or more authorized users of e-wallet 109. Further, each user profile may include controls that govern the access of the user associated with such profile to the payment types stored within e-wallet 109. Thus, for example, U1P 203 may only allow its associated user to access and/or use to payment type $201_1$, whereas U2P 204 may allow its associated user to access and/or use all three of payment types $201_1$, $201_2$, and $201_n$. And as shown, access to all of payment types $201_1$, $201_2$, and $201_n$ by such user profiles is governed by controls set in e-wallet policy 202.

In the non-limiting example shown in FIG. 2B, EWPMM 112 has established individual e-wallet policies $202_1$, $202_2$, and $202_n$ that are associated with payment types $201_1$, $201_2$ and $201_n$ respectively. Each of the e-wallet policies may include controls that govern access to the payment type with which it is associated. In this case for example, e-wallet policy $202_1$ governs payment type $201_1$, e-wallet policy $202_2$ governs payment type $201_2$, and e-wallet policy $202_n$ governs payment type $201_n$. In addition, EWPMM 112 has established and associated multiple user profiles with each of these e-wallet policies. Specifically, E-wallet policy $202_1$ is associated with U1P $203_1$, U2P $204_1$, and UNP $205_1$; e-wallet policy $202_2$ is associated with U1P $203_2$, U2P $204_2$, and UNP $205_2$; and e-wallet policy $202_n$ is associated with U1P $203_n$, U2P $204_n$, and UNP $205_n$. Each user profile may include identifying indicia, security indicia, and/or controls that are specific to the e-wallet policy and payment type with which the user profile is associated. In some embodiments, the establishment of e-wallet policies and user profiles that are specific to one or a subset of payment types in an e-wallet may offer a greater degree of flexibility and control over the sharing and usage of an e-wallet amongst multiple users, relative to the use of a global e-wallet policy that governs all payment types in an e-wallet.

As may be appreciated from FIGS. 2A and 2B, a user profile may grant more, less, or the same access to a payment type as its affiliated e-wallet policy. However, because the user profiles described herein may be governed (dominated) by their associated e-wallet policy, an e-wallet policy may deny a transaction that would be otherwise permitted by a user profile. Thus, in some non-limiting embodiments of the present disclosure, the access granted by a user profile to an e-wallet payment type may be the same or less than the access granted to such payment type by an e-wallet policy governing that payment type.

By way of example, an e-wallet policy may set a $500/transaction limit on transactions made with payment type "A" stored in an e-wallet. However, a user profile associated with the e-wallet policy may limit transactions made with payment type A to $10 per transaction. If a user associated with the user profile attempts a transaction that would violate the constraints set by either or both of the e-wallet policy and the user profile, the transaction may not be allowed to proceed.

While FIGS. 2A and 2B depict examples in which one or a few e-wallet policies and/or user profiles are used, it should be understood that the systems and methods of the present disclosure may employ any number of e-wallet policies and/or user profiles. Indeed, the present disclosure contemplates systems and methods wherein a one and/or a plurality of e-wallet policies are associated with all or a subset of the payment types stored in an e-wallet. Likewise, the present disclosure contemplates systems and methods wherein one and/or a plurality user profiles is/are associate with all or a subset of such e-wallet policies.

Figure 3:
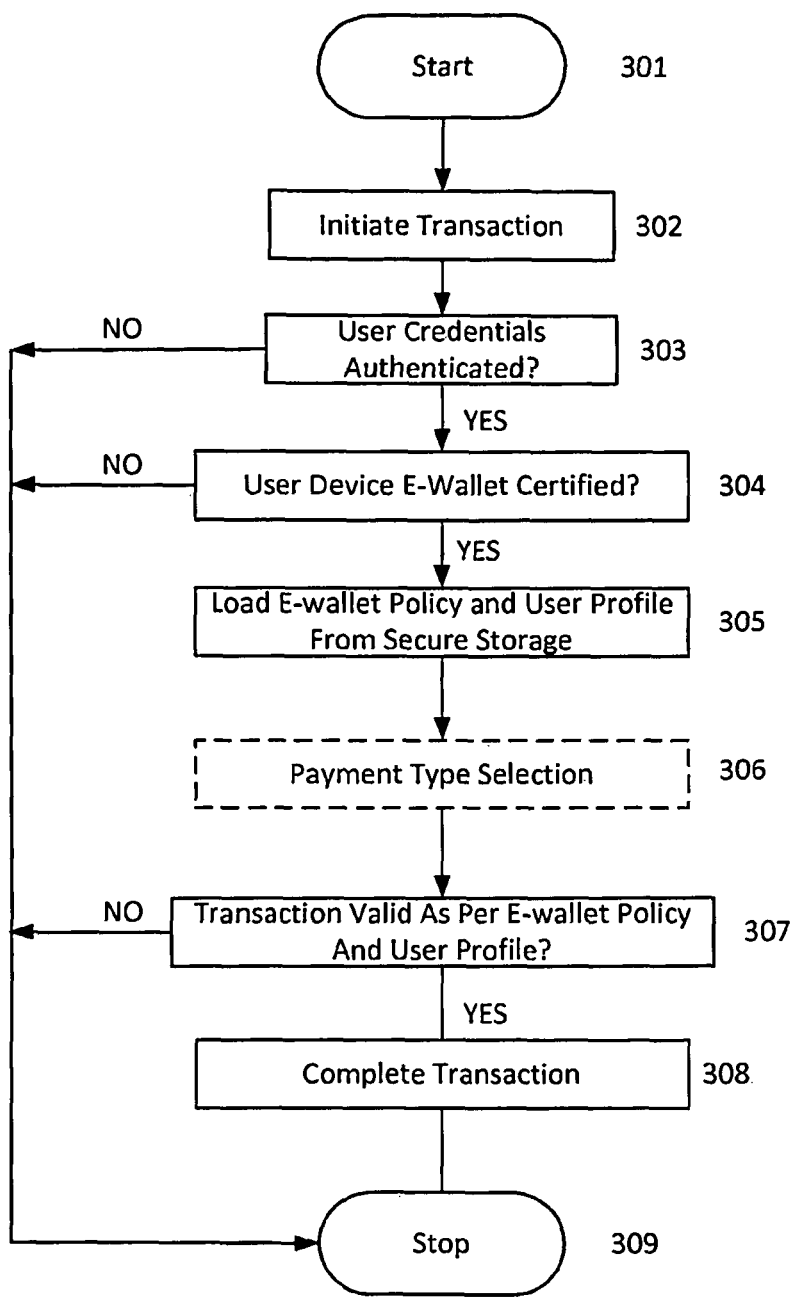
FIG. 3 is a flowchart of an exemplary method of conducting an e-wallet transaction with an e-wallet that is shared among multiple users on a single device, in accordance with non-limiting embodiments of the present disclosure.

FIG. 3 depicts a non-limiting example of a method of conducting an e-wallet transaction using an e-wallet that is shared amongst multiple users on a single device. The method starts at block 301. At block 302, a user may initiate an e-wallet transaction with a device (hereafter, "host device"). Such a device may be an e-wallet certified device that includes an e-wallet within a secure execution environment (e.g., device 100 in FIG. 1). Initiation of the transaction may occur, for example, by a user invoking or making inputs to a user interface associated with an e-wallet (e.g., EWUI 114 in FIG. 1). At block 303, an authentication operation may be performed on the credentials of the user of the device. As described above, such authentication operation may be performed by the host device and/or by a remote authentication server. In any case, the credentials supplied by the user of the host device may be used identify and select an appropriate e-wallet policy (or policies) and user profile (or profiles) for governing the proposed transaction.

If the authentication operation fails, the transaction may be denied. If the authentication operation succeeds however, the transaction is allowed to proceed to block 304. At block 304, a determination may be made as to whether the host device is an e-wallet certified device. If the host device is not e-wallet certified, the transaction may be denied. If the host device is e-wallet certified however, the method may proceed to block 305, wherein the host device loads the relevant e-wallet policy(ies) and user profile(s) from secure storage within the device.

At optional block 306, the user of the host device may select a payment type within the e-wallet, e.g., using a user interface as described above. Alternatively, the process may proceed using a default payment type that may be associated with a pertinent e-wallet policy and/or user profile. Regardless of whether a payment type is selected or a default payment type is used, the method may proceed to block 307, wherein the host device may compare the parameters of the proposed transaction to the controls set by the e-wallet policy(ies) and user profile(s) that was (were) loaded in block 305. If the parameters of the transaction violate such controls, the transaction may be denied. If the transaction parameters comply with the controls set by the user profile (s) and e-wallet policy(ies) however, the method may continue to block 308 and the transaction may be allowed to complete using the relevant payment information in the e-wallet stored on the host device. At block 309, the method is concluded.

As may be appreciated from the above, the systems and methods of the present disclosure can enable the sharing of an e-wallet amongst multiple users on a single electronic device. In some instances however, it may be desirable to share an e-wallet amongst multiple electronic devices and/or among multiple users on multiple electronic devices. Accordingly, another aspect of the present disclosure relates to systems and methods wherein an e-wallet may be shared in such a manner.

Figure 4A:
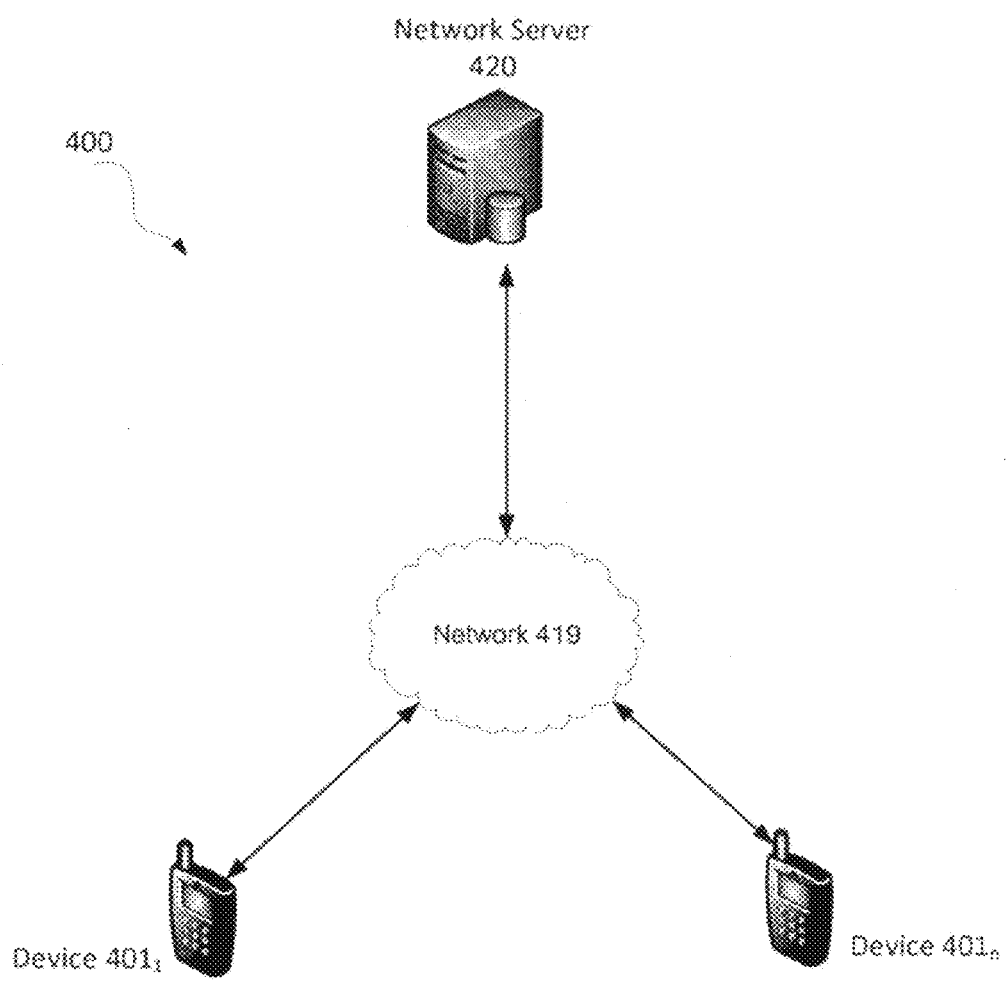
FIG. 4A depicts exemplary system architecture wherein an e-wallet is shared among multiple devices and/or multiple users on multiple devices, in accordance with non-limiting embodiments of the present disclosure.
Figure 4B:
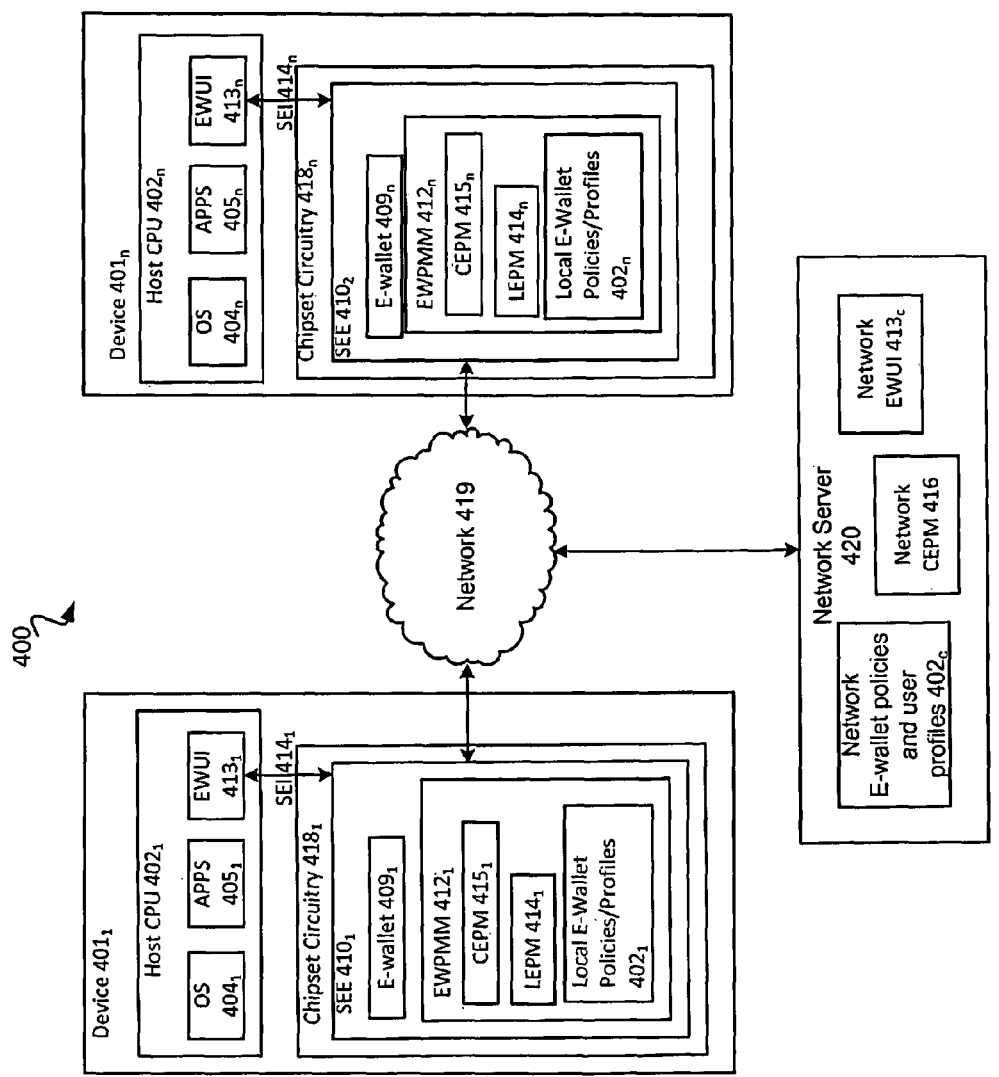
FIG. 4B illustrates more detailed exemplary system architecture wherein an e-wallet is shared among multiple devices and/or multiple users on multiple devices, in accordance with non-limiting embodiments of the present disclosure.

In this regard, reference is made to FIG. 4A, which depicts an exemplary system architecture in accordance with non-limiting embodiments of the present disclosure. As shown, system 400 includes device $401_1$, device $401_n$, and network server 420. As shown, such components may bi-directionally communicate with one another via network 419. Network 419 may be any network that carries data. As examples of suitable networks that may be used as network 419 in accordance with the present disclosure, non-limiting mention is made of the internet (also referred to herein as the "cloud"), private networks (e.g., a local area network), virtual private networks (VPN), public switch telephone networks (PSTN), integrated services digital networks (ISDN), digital subscriber link networks (DSL), wireless data networks (e.g., cellular phone networks, wireless local area networks, and the like), combinations thereof, and other networks capable of carrying data. In some non-limiting embodiments, network 102 includes at least one of the internet, a local area network, a wireless local area network, a cellular telephone network, and combinations thereof Network server 420 may be executed on a single server machine or a number of server machines, which may be co-located or distributed geographically. In operation, network server 420 may store a network copy of the e-wallet policies and/or user profiles that may be used to manage one or more e-wallets locally provisioned on device $401_1$, device $401_n$ (hereafter, "network e-wallet policies and/or user profiles"), and combinations thereof. Network server 420 may also include one or more modules (such as but not limited to a cloud e-wallet policy management module, "CEPM") that function to establish and/or manage the network e-wallet policies and/or user profiles. Network server 420 may further include at least one interface (e.g., a web user interface) that can interface with such modules and allow an authorized user to log in, configure and/or otherwise manage the network copy of the e-wallet policies and user profiles associated with an e-wallet from a device that has access to the network server, e.g., through network 419. Network server 420 may also function to download (e.g., "push") the network e-wallet policies and/or user profiles to devices associated with an e-wallet, such as, for example, devices $401_1$ and $401_n$. In this way, network server 420 can operate to synchronize e-wallet policies and profiles associated with an e-wallet amongst multiple devices.

Devices $401_1$ and/or $401_n$ may each be provisioned with the same e-wallet, and may each include a local copy of e-wallet policies and user profiles associated with that e-wallet (hereafter, "local e-wallet policies and/or user profiles"). Such devices may also include an EWPMM that can function to manage such local e-wallet policies and/or user profiles. And in some embodiments, any or all of devices $401_1$ and $401_n$ may include an EWPMM that can manage and/or synchronize local e-wallet policies and/or user profiles associated with an e-wallet with remotely stored copies of such e-wallet policies and user profiles. Non-limiting examples of remotely stored e-wallet policies and user profiles include network e-wallet policies and/or user profiles stored on network server 420 and/or copies stored on another of devices $401_1$ and/or $401_n$.

As a non-limiting illustration of this concept, reference is made to FIG. 4B, which provides additional detail with respect to exemplary components of device $401_1$, $401_n$, and network server 420 in system 400. For the sake of illustration only, devices $401_1$ and $401_n$ are depicted in FIG. 4 as having identical hardware and software components. It should be understood however, that system 400 may include electronic devices with differing hardware and/or software functionality. For example, device $401_1$ may be an e-wallet certified device, whereas device $401_n$ may be an e-wallet uncertified electronic device. In the non-limiting example of FIG. 4, devices $401_1$ and $401_n$ are each e-wallet certified devices. Moreover, while FIGS. 4A and 4B depict system 400 as including a single network server, a single network, and two devices, it should be understood that any number of such components may be used. Indeed, the systems and methods of the present disclosure may include one or a plurality of all or a subset of such components.

With respect to devices used in system 400, for example, the subscript "n" is used to indicate that one or a plurality of devices may be present. It should therefore be understood that the subscript "n" correlates to a non-zero integer, e.g., 1, 2, 3, 4, 5, and so forth. Further, while the present disclosure may make reference to a device identified with a subscript "n" in the singular, such reference should be construed as including the plural form as well. For example, "component $X_n$," should be understood as referencing one or a plurality of X components.

With further reference to FIG. 4B, device $401_1$ includes host CPU $402_1$ that may execute software, such as for example OS $404_1$ and APPS $405_1$. In addition, device $401_1$ includes chipset circuitry $418_1$. Chipset circuitry $418_1$ includes a secure execution environment (SEE) $410_1$, which may be provisioned by secure storage and/or a security engine, as previously described. E-wallet $409_1$ is stored and executed within SEE $410_1$. In addition, EWPMM $412_1$ is stored and executed within SEE $410_1$. EWPMM $412_1$ may include a local e-wallet policy management module (LEPM) $414_1$ and/or a cloud e-wallet policy management module (CEPM) $415_1$.

LEPM $414_1$ may take the form of instructions stored on a computer readable medium (e.g., a secure memory) which when executed by a processor cause the processor to perform local e-wallet policy and/or user profile establishment and/or management functions consistent with the present disclosure. For example, LEPM $415_1$ may create and or manage local e-wallet policies and user profiles $402_1$ that are stored within SEE $410_1$. LEPM $414_1$ may also receive inputs from e-wallet user interface $413_1$ via secure execution environment interface $414_1$. In some embodiments, therefore an authorized user may establish, manage, and modify locally stored e-wallet policies and user profiles on device $401_1$ via a combination of EWUI $413_1$ and LEPM $414_1$.

CEPM $415_1$ may be in the form of instructions stored on a computer readable medium (e.g., a secure memory) which when executed by a processor cause the processor to perform remote e-wallet policy and/or user profile establishment and/or management functions consistent with the present disclosure. In this regard, CEPM $415_1$ when executed may cause a processor to communicate, via network 419, with network server 420 in a manner that is independent of host CPU $402_1$, OS $404_1$, and/or a BIOS (not shown) of Device $401_1$. In this way, CEPM $415_1$ can provide a secure mechanism for establishing and managing remotely stored e-wallet policies and user profiles. For example, CEPM $415_1$ when executed may facilitate the creation and/or management of network e-wallet policies and/or user profiles $402_c$ on network server 420. In addition, CEPM $415_1$ when executed may facilitate the synchronization of the local e-wallet policies and user profiles stored on device $401_1$ with remote copies of such policies and profiles (e.g., network e-wallet profiles and user profiles $402_c$ on network server 420), as will be described below.

Device $401_n$ may include components that may be substantially similar in composition and function as the components of device $401_1$. It should therefore be understood that the nature and functions of the components of device $401_1$ equally apply to the components of device $401_n$. The nature and function of the components of device $401_n$ are therefore not expressly recited herein.

As further shown in FIG. 4B, network server may include a network e-wallet policies and user profiles 402, which may be associated with e-wallet $409_1$, $409_n$ stored on devices $401_1$, $401_n$. Network e-wallet policies and user profiles $402_c$ may be the same or different from corresponding local e-wallet policies and user profiles stored on devices $401_1$, $401_n$. In addition, network server 420 may include a cloud e-wallet policy management module (hereinafter, a "network CEPM" or "cloud CEPM") that can establish and manage e-wallet policies and/or user profiles within network server 420, and in some cases synchronize such policies and profiles with corresponding policies and profiles locally stored on devices associated with an e-wallet. E-wallet policies and user profiles that are stored within a network server are referred to herein as "network e-wallet policies" and "network user profiles" (collectively, "network e-wallet policies and user profiles").

In the non-limiting example shown in FIG. 4B, network server 420 includes CEPM 416. Network CEPM 416 may constitute instructions stored on a computer readable medium, which when executed by a processor cause the processor to perform network e-wallet policy and user profile establishment and management functions consistent with the present disclosure. Accordingly, network CEPM 416 may include similar functionality as LEPM $414_1$, $414_n$, except that it may establish and manage network e-wallet policies and user profiles on network server 420, as opposed to local e-wallet policies and profiles that may be stored on devices $401_1$, $401_n$.

Network server 420 may also include network e-wallet user interface (EWUI) $413_c$, which may be used to provide inputs to network server 420 for the establishment and/or management of network e-wallet policies and user profiles $402_c$. In some embodiments, network EWUI 413 may be a web interface, such as but not limited to a web application, website code, and combinations thereof. As may be understood, therefore, an authorized user may establish, manage, and modify network e-wallet policies and user profiles via inputs to network CEPM 416 made through network EWUI $413_c$.

In addition to establishing and managing network e-wallet policies and user profiles $402_c$, network CEPM 416 may facilitate the synchronization of e-wallet policies and user profiles across electronic devices associated with system 400. For example, an authorized user may input changes to network e-wallet policies and user profiles 402 via network EWUI $413_c$. Network CEPM 416 when executed may cause a processor to apply such changes to network e-wallet polices and user profiles $402_c$, and then "push" (e.g., download) the updated network policies and procedures via network 419 to devices associated with system 400, e.g., devices $401_1$ and $401_n$.

Alternatively or additionally, an authorized user may implement changes to local e-wallet policies and/or user profiles on one or more devices associated with system 400 (e.g., local e-wallet policies and user profiles $402_1$, $402_n$). In such instances, a cloud e-wallet policy management module on the relevant device (e.g., CEPM $415_1$, $415_n$) when executed may cause a processor to communicate such changes to network server 420 via network 419. In response, network CEPM 416 may cause a processor to apply such changes to network e-wallet policies and user profiles $402_n$. Network CEPM 416 may then cause a processor to "push" (e.g., download) the updated network policies and user profiles via network 419 to all or a subset of devices associated with system 400 (e.g., devices $401_1$ and/or $401_n$).

Figure 5:
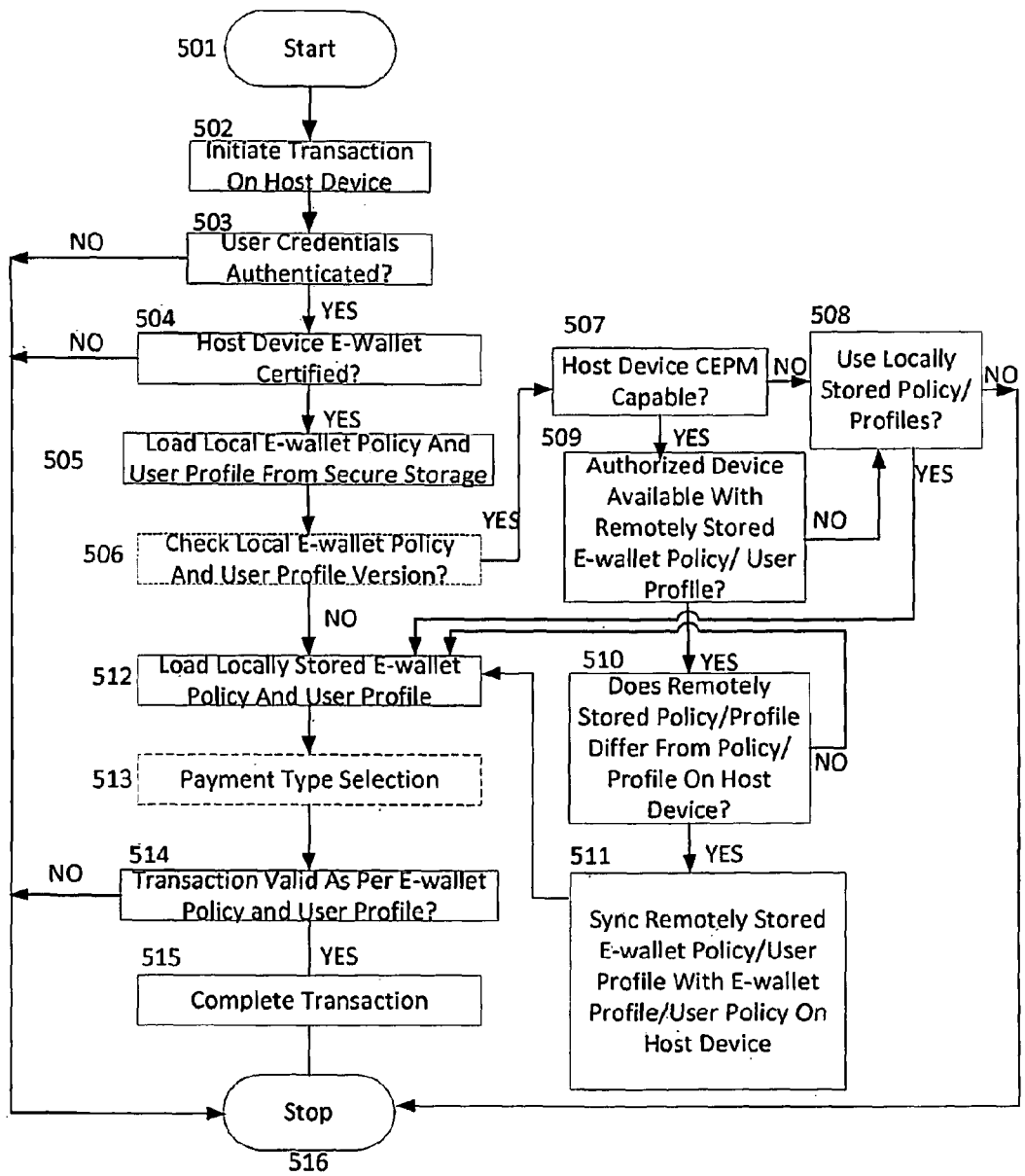
FIG. 5 is a flowchart of an exemplary method of conducting an e-wallet transaction with an e-wallet that is shared among multiple devices and/or multiple users on multiple devices, in accordance with non-limiting embodiments of the present disclosure.

FIG. 5 depicts a non-limiting example of a method of conducting an e-wallet transaction using an e-wallet that is shared amongst multiple users on multiple devices. The method starts at block 501. At block 502, a user may initiate an e-wallet transaction on a device that includes an e-wallet (a "host device"). Initiation of the transaction may occur, for example, by a user invoking or making inputs to a user interface associated with an e-wallet (e.g., EWUI's $413_1$, $413_n$ in FIG. 4B). At block 503, an authentication operation may be performed on the credentials of the user of the host device. Such authentication operation may be similar to the authentication operations discussed with reference to FIG. 3, and so are not reiterated herein in connection with FIG. 5.

If the authentication operation fails, the transaction may be halted. If the authentication operation succeeds however, the method may be allowed to proceed to block 504. At block 504, a determination may be made as to whether the host device is an e-wallet certified device. For example, if the host device is device $401_1$ in FIG. 4B, a determination may be made as to whether device $401_1$ is e-wallet certified device. If the host device is not e-wallet certified, the transaction may not be allowed to proceed. If the host device is e-wallet certified, however, the method may proceed to block 505, wherein the host device loads locally stored e-wallet policies and user profiles from secure storage.

At block 506, a version check may be performed on the e-wallet policies and user profiles that are locally stored on the host device. Such version check may be optional or required. If optional or if such a check is not performed, the method may proceeds to block 512 and the locally stored e-wallet policies and profiles on the host device may be used to govern the transaction. If required or such a check is performed however, the method proceeds to block 507.

At block 507, a determination may be made as to whether the host device is cloud e-wallet policy module (CEPM) capable. That is, the method may determine whether the host device includes a CEPM that is stored and/or executed within a secure execution environment, and which is capable of performing all or a subset of the functions previously described with reference to CEPM's $415_1$, $415_n$ in FIG. 4B. If the host device is not CEPM capable, the method may proceed to block 508, where a determination may be made as to whether to terminate the transaction or to allow the transaction to proceed using the e-wallet policies and procedures locally stored on the host device.

If the host device is CEPM capable, the method may proceed to block 509, wherein a determination is made if another device (hereafter, "remote device") is available with remotely stored e-wallet policies and user profiles associated with the e-wallet on host device. For example, a CEPM on the host device may cause a processor to attempt to communicate with a CEPM executed on a processor of a remote device such as, for example, a network server (e.g., network CEPM 416 in FIG. 4B). If no authorized remote device is available, the process may proceed to block 508 and execute as discussed above. If an authorized remote device is available however, the method may proceed to block 510, where the content and/or version of the local e-wallet policies and/or user profiles on the host device (e.g., local e-wallet policies $402_1$, $402n_r$, in FIG. 4B) may be compared to corresponding remote e-wallet policies and/or user profiles stored on the remote device (e.g., network e-wallet policies and user profiles 402 in FIG. 4B). For example, a CEPM resident on a network server may compare network e-wallet policies and user profiles associate with an e-wallet to local e-wallet policies and user profiles stored on the host device.

If the remote e-wallet policies and/or user profiles are the same as the local e-wallet policies and/or user profiles stored on the host device, the method may proceed to block 512, and the transaction may proceed using the local e-wallet policies and/or user profiles presently stored on the host device to govern the proposed transaction. However, if the remote e-wallet policies and user profiles differ from the e-wallet policies and user profiles stored on the host device, the method may proceeds to block 511, where the local and remote e-wallet policies and/or user profiles may be synchronized.

If the remote e-wallet policies and/or user profiles are more recent than the local e-wallet policies and/or user profiles stored on the host device, the remote e-wallet policies and/or user profiles may be pushed down to the host device so as to replace or otherwise update the corresponding local e-wallet policies and/or user profiles. Alternatively or additionally, if the local e-wallet policies and/or user profiles on the host device are more recent than the remote e-wallet policies and/or user profiles, a CEPM on the remote device may cause a processor to replace or otherwise update the remote e-wallet policies and/or user profiles with the corresponding local e-wallet policies and/or user profiles. Moreover, a CEPM on the remote device may cause the remote device to "push" (download) the updated remote e-wallet policies and/or user profiles to all or a subset of the devices associated with or including the e-wallet associated with the proposed transaction.

At this point, the method may proceed to block 512, wherein the local e-wallet policies and user profiles stored on the host device are loaded. The method may then proceed to optional block 513, wherein a user of the host device may select (e.g., via a user interface) a payment type associated with the e-wallet stored on the host device. The method may then proceed to block 514, wherein the host device may compare the parameters of the proposed transaction (e.g., amount, location, etc.) to the controls set by the local e-wallet policies and/or user profiles loaded in block 512. If the parameters of the proposed transaction violate any of the controls set by the local e-wallet policies and/or user profiles, the transaction may be denied. If the transaction parameters comply with the controls set by the local e-wallet policies and user profiles however, the method may proceeds to block 515 and the transaction may be completed using the e-wallet on the host device. At block 516, the method is concluded.

In some embodiments of the present disclosure, a network server may itself be an e-wallet certified device. Accordingly, the network server may itself be provisioned with an e-wallet that is stored and executed within a secure execution environment, as discussed above. An e-wallet provisioned in this manner is hereinafter called a "cloud e-wallet." In such embodiments, a network CEPM on the network server may include added functionality that allows it to establish and/or manage a cloud e-wallet. A network CEPM that includes such functionality is hereinafter referred to as a "cloud e-wallet management module" (CEMM). For the sake of clarity, it is noted that a CEMM may be capable of establishing and/or managing network e-wallet policies and user profiles, as well as establishing and/or managing a cloud e-wallet.

In some non-limiting embodiments, a CEMM may take the form of instructions stored on a computer readable medium, which when executed by a processor cause a network server to perform at least one of cloud e-wallet management, e-wallet policy management, and/or e-wallet user profile management functions consistent with the present disclosure. That is, execution of such instructions with a processor may cause a network server to establish and/or modify a cloud e-wallet, a network e-wallet policy, a network user profile, or a combination thereof. Moreover, execution of such instructions by a processor may cause a network server to synchronize at least one of a cloud e-wallet, a network e-wallet policy, and a network user profile with e-wallets, e-wallet policies, and/or user profiles that may be locally stored on one or more electronic devices. In this way, a CEMM can facilitate the synchronization and distribution of an e-wallet and associated policies and profiles among multiple electronic devices.

Accordingly, the present disclosure contemplates methods wherein an e-wallet transaction may be initiated from a host device and supported by a network server including a cloud e-wallet. As may be understood, such transactions may proceed in substantially the same manner as the method shown in FIG. 5 and described above. Of course, such methods may include additional steps and/or further operations performed within the steps of the flow diagram in FIG. 5. For example, such method may include an e-wallet version check and/or update, in which a local e-wallet on a device may be synchronized with a cloud e-wallet. Such a check/update may be performed in a manner similar to that depicted in blocks 506-511 of FIG. 5.

That is, the present disclosure contemplates methods wherein a local e-wallet on a host device may be compared to and/or synchronized with remotely stored e-wallet (e.g., a cloud e-wallet). If the locally stored e-wallet is more recent than the cloud e-wallet, a CEMM may cause the remote device replace or otherwise update the cloud e-wallet with the local e-wallet, and subsequently "push" the updated cloud e-wallet down to relevant devices. In contrast, if the cloud e-wallet is more recent than the locally e-wallet, a CEMM may cause the remote device (e.g., network server) replace or otherwise the locally stored e-wallet a copy of the cloud e-wallet. In this way, the systems and methods of the present disclosure may synchronize a remotely stored e-wallet (such but not limited to a cloud e-wallet) with one or more local e-wallets that may be stored on or more devices.

Accordingly, the systems and methods of the present disclosure can enable sharing of an e-wallet, e-wallet policies, user profiles, and combinations thereof among multiple e-wallet certified devices, among multiple users, and among multiple users on multiple e-wallet certified devices, as described above. In some instances, however, it may be desirable to permit the use of an e-wallet on an e-wallet uncertified electronic device. Moreover, it may be desirable to allow an authorized e-wallet user to use an e-wallet that is stored remotely, i.e., on a device other than (or which is otherwise remote from) the user's device. Accordingly, another aspect of the present disclosure relates to systems and methods that permit remote sharing and/or use of an e-wallet across heterogeneous devices with varied hardware/software of combinations thereof.

Figure 6A:
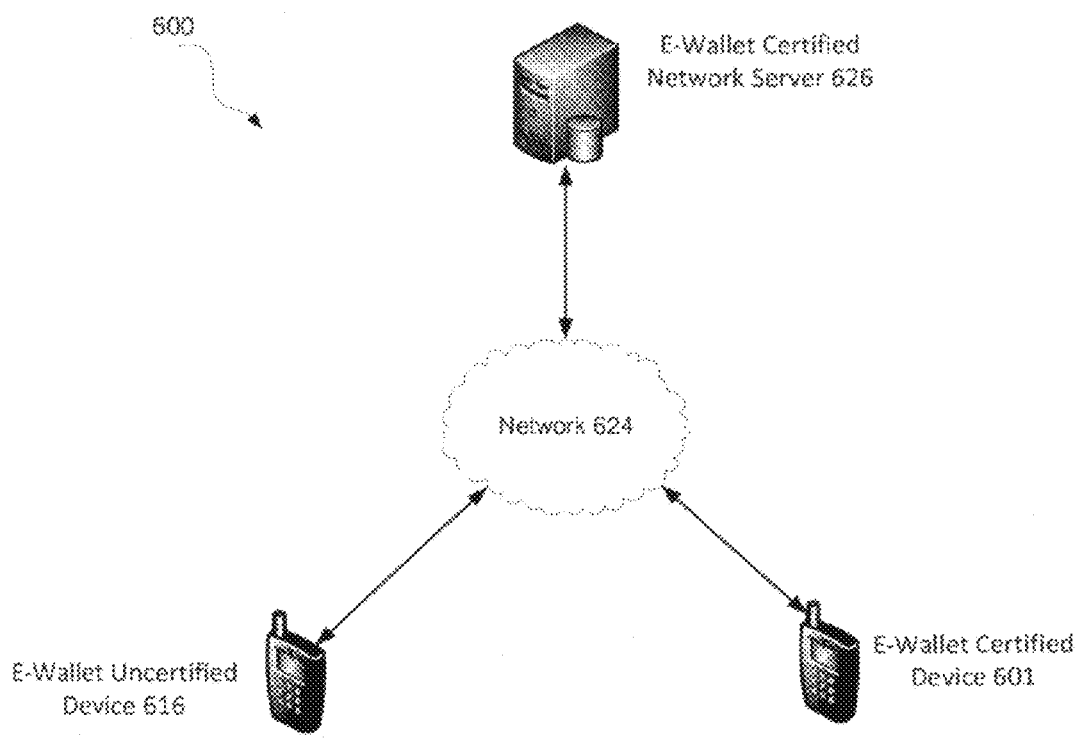
FIG. 6A depicts exemplary system architecture wherein an e-wallet may be shared among and/or leveraged by multiple devices with different capabilities, in accordance with non-limiting embodiments of the present disclosure.
Figure 6B:
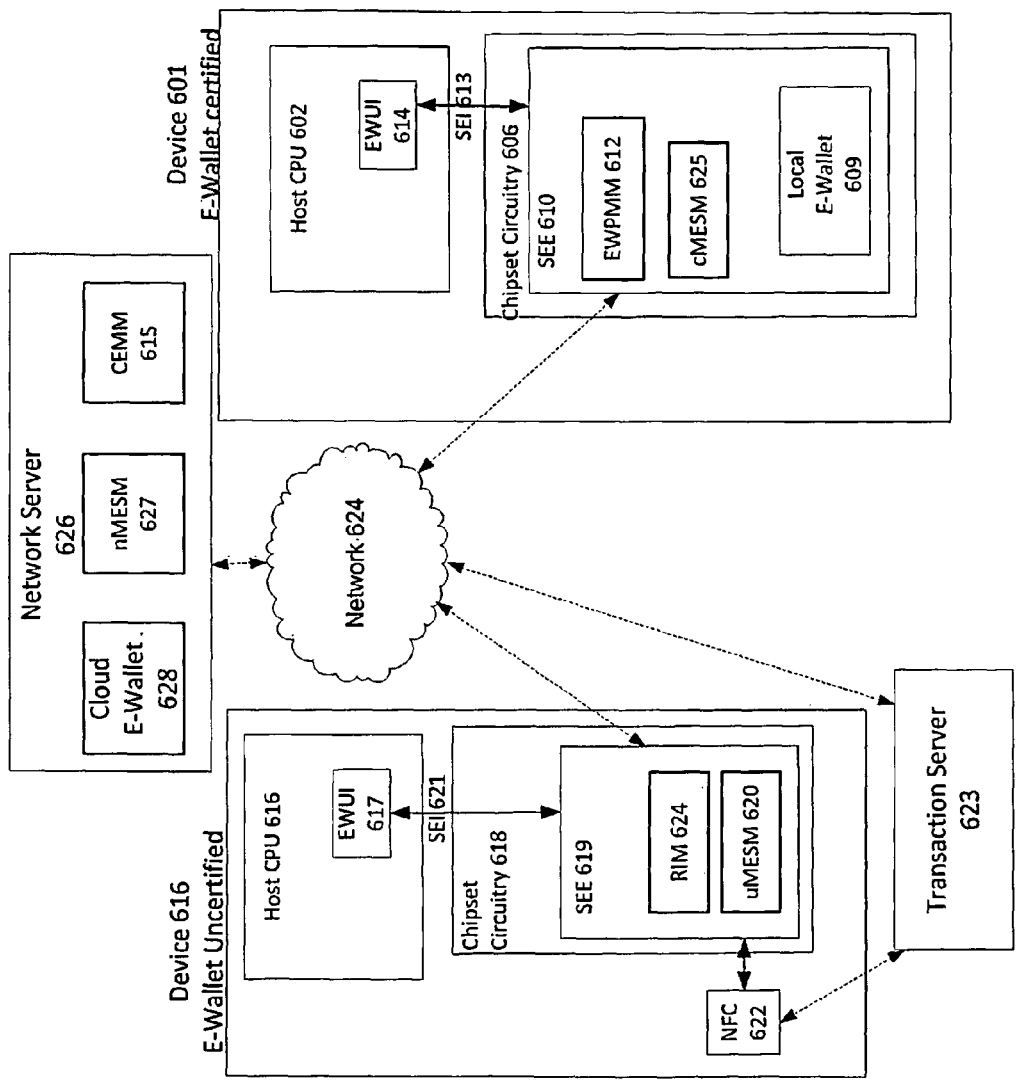
FIG. 6B illustrates more detailed exemplary system architecture wherein an e-wallet may be shared among and/or leveraged by multiple devices of with different capabilities, in accordance with non-limiting embodiments of the present disclosure.

In this regard, reference is made to FIGS. 6A and 6B, which depict an exemplary system architecture in accordance with non-limiting embodiments of the present disclosure. As shown, system 600 includes e-wallet uncertified device 616, e-wallet certified device 601, and network server 626. As shown, such components may bidirectionally communicate with one another via network 624. Network 624 may be any network that carries data, such as but not limited to those mentioned above in connection with network 419 in FIG. 4A. For the sake of clarity, FIGS. 6A and 6B only depict one e-wallet uncertified device, one e-wallet certified device, one network, and one network server. However, it should be understood that system 600 may include one or a plurality of any or a subset of such components.

As noted above, device 616 in system 600 may be an e-wallet uncertified device. However, device 616 may be capable of storing and executing instructions within a secure execution environment that includes, for example at least one of secure storage and a security engine. In such instances, device 616 may store and execute a multi device e-wallet sharing module ("MESM") within such a secure execution environment. An MESM provisioned on an e-wallet uncertified device in this manner is hereinafter called an uncertified MESM, or "uMESM". As will be described in detail below, uMESM may enable device 616 to leverage a remotely stored e-wallet to conduct transactions, even though device 616 is itself e-wallet uncertified.

Moreover, device 616 may include one or more remote invocation modules (RIM) that can remotely invoke a cloud e-wallet management module (CEMM) on a network server. As will be described in further detail below, such RIM modules may cause the CEMM on the network server to communicate with a transaction server that is capable of accepting remote e-wallet transactions.

Network server 626 may itself be an e-wallet certified device, and may include a cloud e-wallet and associated network e-wallet policies and/or user profiles. In addition, network server 626 may include at least one MESM, hereinafter referred to as a network MESM, or "nMESM". As will be described in detail below, a nMESM may allow the cloud e-wallet within network server 626 to be leveraged by device 616 to conduct transactions, even though device 616 is itself e-wallet uncertified.

Device 601 may be an e-wallet certified device. Accordingly, device 601 may include a locally stored e-wallet, associated e-wallet policies, and user profiles such as but not limited to those described above in association with devices 401₁ and 401ₙ in FIGS. 4A and 4B. With reference to FIG. 6B, device 601 may further include host processor 602. Host processor 602 may execute e-wallet user interface (EWUI) 614, which may communicate via secure execution environment interface (SEI) 613 with secure execution environment (SEE) 610 (and components thereof) within chipset circuitry 606.

Device 601 may also include an MESM, which may be stored and executed within SEE 610. An MESM stored on an e-wallet certified device in this manner is hereinafter referred to as a certified MESM, or "cMESM". As will be described in detail below, a cMESM may allow the local e-wallet stored on an e-wallet certified device (e.g., device 601) to be leveraged by an e-wallet uncertified device (e.g., device 616) to conduct e-wallet transactions.

Regardless of its location, any MESM disclosed herein may take the form of a computer readable medium having instructions stored thereon which when executed by a processor cause the processor to perform multi device e-wallet sharing functions consistent with the present disclosure.

With further reference to FIG. 6B, device 616 may include host CPU 616 and chipset circuitry 618. Although device 616 is an e-wallet uncertified device, it may include secure execution environment 619. Without limitation, secure execution environment (SEE) 619 may include secure storage and/or a security engine, as previously described. As shown, RIM 624 and uMESM 620 may be stored and executed within SEE 619. These and other components of SEE 619 may receive inputs from user interface EWUI 617 via secure execution environment interface (SEI) 621.

In some embodiments, a user of device 616 may wish to conduct an e-wallet transaction with transaction server 623 (e.g., a payment terminal, an internet payment server, etc.). Because device 616 is e-wallet uncertified, it may not include a locally stored e-wallet that can be used to conduct the transaction. However, device 616 may include RIM 624 and/or uMESM 620, either of which may be used to facilitate a proposed e-wallet transaction by leveraging an e-wallet stored on a remote e-wallet certified device, e.g., network server 626 and/or device 601.

In some non-limiting embodiments of the present disclosure, device 616 includes uMESM 620 within SEE 619. As mentioned above and discussed below, uMESM 620 may be used to leverage cloud e-wallet 628 on network server 626. Thus, for example, uMESM 620 may take the form of instructions stored on a computer readable medium which when executed by a processor cause the processor to communicate via network 624 with nMESM 627 on network server 628. Such communications may include, without limitation, a request to use cloud e-wallet 628 to conduct the proposed transaction.

nMESM 627 may, after appropriately authenticating communications from uMESM 620, cause network server 626 to share information relevant to cloud e-wallet 628 with uMESM 620. For example, nMESM 627 may cause network server 626 to transmit information to device 616 relating to one or more payment types stored in cloud e-wallet 628, network e-wallet policies and user profiles associated with cloud e-wallet 628, and so forth. If the parameters of the proposed transaction comply with the controls set by such network e-wallet policies and user profiles, uMESM 620 may communicate payment information to transaction server 623 via near field communication (NFC) controller 622 (or another appropriate interface). The transaction may then be completed using the payment information provided by device 616.

In further non-limiting embodiments of the present disclosure, device 616 may use uMESM 620 to leverage local e-wallet 609 on device 601 (an e-wallet certified device) to facilitate a proposed e-wallet transaction. In such embodiments, uMESM 620 may take the form of instructions stored on a computer readable medium which when executed by a processor cause the processor to communicate via network 624 with cMESM 625 on device 601. Such communications may include, for example, a request to use local e-wallet 609 to conduct the proposed transaction.

cMESM 625 may, after appropriately authenticating communications from uMESM 620 ("e.g., via one or more authentication operations), cause device 601 to share information relevant to local e-wallet 609 with uMESM 620. For example, cMESM 625 may cause device 601 to transmit information to device 616 relating to one or more payment types stored in local e-wallet 609, local e-wallet policies and user profiles associated with local e-wallet 609, and so forth. If the parameters of the proposed transaction comply with the controls set by such local e-wallet policies and user profiles, uMESM 620 may communicate payment information received from cMESM 625 to transaction server 623 via near field communication (NFC) controller 622 (or another appropriate interface). The transaction may be completed using the payment information provided by device 616.

In some instances, however device 616 may not include uMESM 620 and/or a user of device 616 may not wish to conduct an e-wallet transaction using the MESM methodologies discussed above. In such instances, it may be possible for device 616 to remotely invoke the transmission of remotely stored e-wallet information to a transaction server. Although such methods may require the transaction server to be capable of accepting payment information provided in this way, such a process may limit or avoid the transmission of sensitive e-wallet information to device 616, which is e-wallet uncertified. Such a methodology may therefore be considered more secure than the MESM methodologies specified above, particularly if the transaction server is itself an e-wallet certified device.

In this regard, further reference is made to the non-limiting system architecture shown in FIG. 6B, wherein device 616 includes a remote invocation module (RIM) 624 within SEE 619. In some embodiments, RIM 624 may take the form of instructions stored on a computer readable medium, which when executed by a processor cause the processor to initiate communications that invoke CEMM 615 on network server 626. Such communications may include, for example, a request to use cloud e-wallet 628 to conduct a proposed e-wallet transaction.

CEMM 615 may, after appropriately authenticating communications from RIM 624, cause network server 626 to attempt to initiate communication with transaction server 623 via network 624. If transaction server 623 is capable of communicating with network server 626 in this manner, CEMM 615 may cause network server to transmit information to transactions server 623 that is relevant to cloud e-wallet 628. Such information may include, for example, information regarding one or more payment types stored in cloud e-wallet 626, network e-wallet policies and user profiles associated with cloud e-wallet 626, and so forth. If the parameters of the proposed transaction comply with the controls set by such network e-wallet policies and user profiles, CEMM 615 may cause network server 626 to communicate payment information directly to transaction server 623 via network 624 (or another appropriate interface). The transaction may then be completed using the payment information provided by network server 626. In a similar manner, device 601 may communicate directly with transaction server 623 to support a transaction invoked by uMESM 620 on device 616. In some instances, communication between device 601 to transaction server 623 may be considered more secure than communications from network server 626 and transaction server 623.

Figure 7:
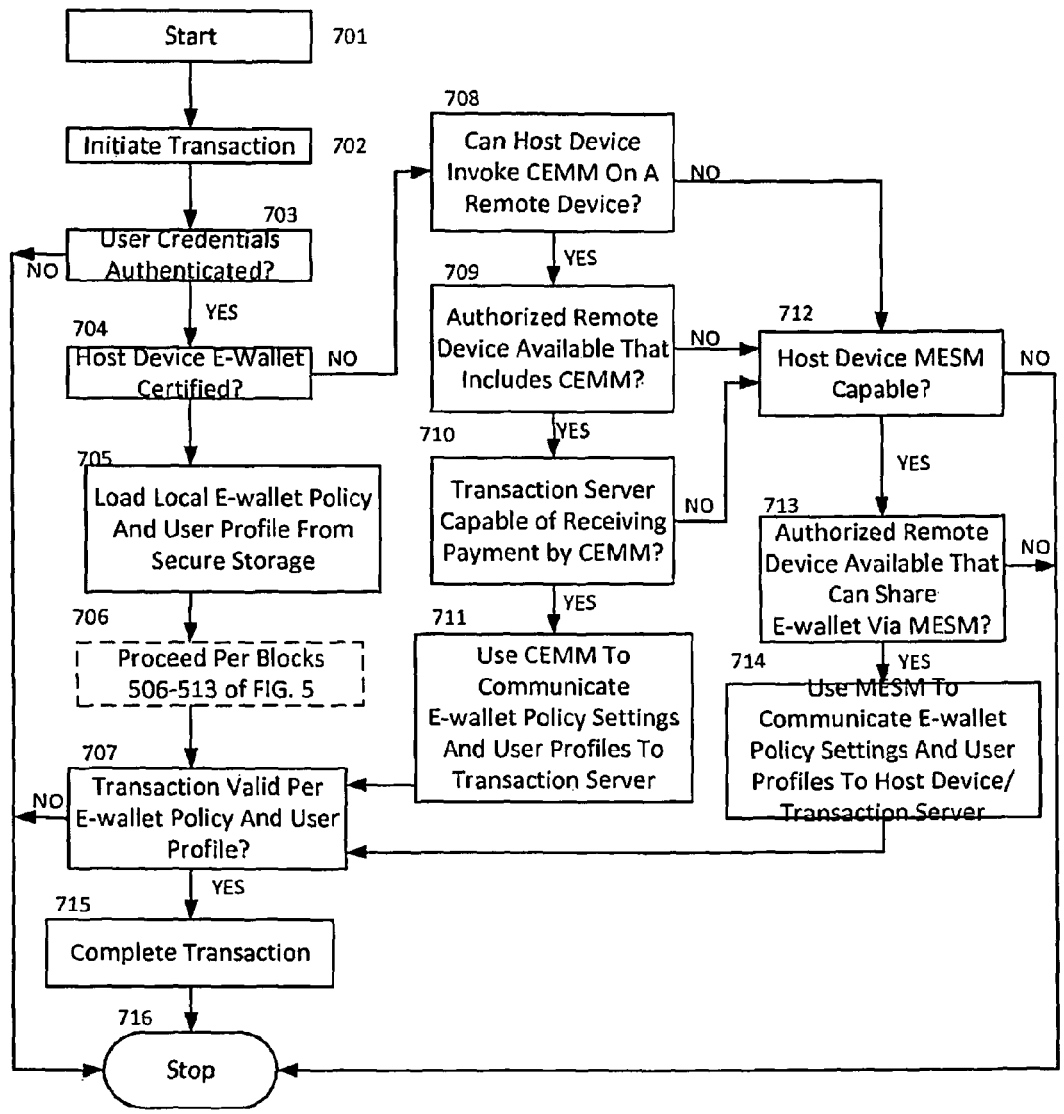
FIG. 7 is a flowchart of an exemplary method of conducting an e-wallet transaction with an e-wallet uncertified electronic device, in accordance with non-limiting embodiment of the present disclosure.

FIG. 7 is a flow diagram of an exemplary method of conducting an e-wallet transaction in accordance with non-limiting embodiments of the present disclosure. As shown in this example, the method begins at block 701. At block 702, a user of an electronic device may initiate an e-wallet transaction using a host electronic device ("host device"). At block 703, the user's credentials (e.g., identifying indicia, security indicia, etc.) may be authenticated by the system. If the user's credentials cannot be authenticated, the transaction may be denied. If the user's credentials are successfully authenticated, however, the method may proceed to block 704.

At block 704, a determination is made as to whether the host device is an e-wallet certified electronic device. If the host device is e-wallet certified, the local e-wallet policies and user profiles on the device may be loaded (block 705) and the transaction may proceed (block 705) per blocks 506-513 of FIG. 5. Alternatively, the method may proceed directly to block 707, where the system may determine whether the proposed transaction is valid per the relevant e-wallet policies and user profiles. If so, the transaction may be completed (block 715). If not, the proposed transaction may be denied.

If it is determined (block 704) that the host device is not an e-wallet certified device, the system may determine (block 708) whether the host device can invoke ECMM on a remote device. Thus for example, the system may determine whether the host device includes a RIM module that can invoke an ECMM on an e-wallet certified network server, as discussed above in connection with FIG. 6B. If the host system can invoke ECMM on a remote device, the system may then determine (block 709) whether an authorized remote device is available and capable of sharing remotely stored e-wallet information with a transaction server via CEMM. Thus, for example, the system may determine whether an e-wallet certified network server containing a cloud e-wallet is available and, if so, whether such server includes the CEMM functionality described above.

If an authorized remote device is available and includes CEMM functionality, the system may then (block 710) determine whether a transaction server associated with the transaction is capable of receiving payment information that is sent by the authorized remote device via CEMM. Without limitation, such a determination may be made by initiating communication between the authorized remote device and the transaction server. For example, the authorized remote device may attempt to conduct a handshake and/or authentication operation with the transaction server.

If the relevant transaction server can receive payment information by CEMM, the system may then (block 711) use CEMM to communicate e-wallet policy settings and user profiles from the authorized remote device to the transaction server (block 711). Such communication may occur, for example, between the CEMM on the remote device and the transaction server. Alternatively or additionally, the CEMM on the remote device may communicate relevant e-wallet information to the host device, which can then transmit such information to the relevant transaction server. IN any case, if the proposed transaction is complies (block 707) with the controls set by such e-wallet policies and user profiles, it may be completed (block 715) by transmitting payment information from the authorized remote device to the transaction server. If the proposed transaction violates (block 707) the controls set by the relevant e-wallet policies and/or user profiles, it may be denied.

If the host device cannot invoke CEMM on a remote device (block 708), an authorized remote device does not include CEMM or is unavailable (block 709), if a relevant transaction server is not capable of receiving payment by CEMM (block 710), and/or if a user of the host device does not wish to use ECMM to conduct the proposed transaction, the system may determine (block 712) wherein the host device is capable of leveraging a remote e-wallet by MESM. Thus, for example, the system may determine whether the host device includes an MESM module within a secure execution environment, and which has the MESM functionality described previously in connection with FIGS. 6A and 6B. If the host device does not include MESM functionality (i.e., is not MESM capable), the proposed transaction may be denied. If the host device is MESM capable, however, the system may determine (block 713) whether an authorized remote device is available that can share an e-wallet via MESM. Thus, for example, the host device may determine whether any remote devices associated with an e-wallet (which the user of host device is authorized to use) are available and include the MESM functionality described above. Such authorized remote devices may include, for example, a network server or an e-wallet certified device, such as but not limited to those discussed above in connection with FIGS. 6A and 6B.

If an authorized remote device including MESM functionality is not available, the proposed transaction may be denied. If an authorized remote device including MESM functionality is available however, the system may use (block 714) MESM to communicate information to the host device that is relevant to an e-wallet stored on the remote device. For example, where the remote device is an e-wallet certified device that includes an e-wallet locally stored thereon, such communications may include information regarding an e-wallet stored locally within such device, payment type information stored within such an e-wallet, associated e-wallet policies and user profiles, and other information. Alternatively or additionally, MESM can be used to communicate e-wallet information from the remote device directly to relevant transaction server, provided that the transaction server is capable of receiving such communications. If so, communication between the MESM on the remote device and the transaction server may be considered more secure then communications that route e-wallet information from the MESM on the remote device through an e-wallet uncertified device.

Other embodiments of the present disclosure will be apparent to those skilled in the art from consideration of the specification and practice of the inventions disclosed herein.

It is intended that the specification be considered as exemplary only, with a true scope and spirit of the invention being indicated by the following claims.

What is claimed is:

1. A system comprising:
a first electronic device comprising:
a device platform comprising:
a first host processor;
an operating system;
a BIOS;
an e-wallet user interface; and
chipset circuitry comprising a microcontroller disposed therein, said microcontroller being inaccessible to said first host processor, and said operating system, and said BIOS;
a first secure execution environment, said first secure execution environment being inaccessible to said first host processor, said operating system, and said BIOS;
at least one first secure memory;
a secure execution environment interface coupling said e-wallet user interface to said first secure memory;
an electronic wallet encoded in said at least one first secure memory;
a first local copy of at least one electronic wallet policy encoded in said at least one secure memory and comprising a first control set;
a first local copy of at least one user profile specific to a subset of multiple authorized users of said electronic wallet, said at least one user profile comprising a second control set; and
a non-transitory medium containing computer readable instructions in the first secure memory once executed by the microcontroller causes the secure processor to perform the steps of:
executing the first local copy of user profile;
receiving a request payment type;
determining to grant access the requested payment type from the executed first local copy of user profile;
based on a determination that the setting of said executed user profile is not dominant over said e-wallet policy, granting access to the requested payment type; and
based on a determination that the setting of said executed user profile is dominant over said e-wallet policy, denying access to the requested payment type.

2. The system of claim 1, wherein information regarding multiple payment types is stored in said electronic wallet; and
said at least one electronic wallet policy comprises at least one payment type specific electronic wallet policy affiliated with a subset of said multiple payment types.

3. The system of claim 1, wherein information regarding multiple payment types is stored in said electronic wallet; and
said at least one user profile comprises at least one payment type specific user profile affiliated with a subset of said multiple payment types.

4. The system of claim 1, wherein said first electronic device further comprises electronic wallet policy management module instructions stored on said at least one memory and executed within said secure execution environment, wherein said electronic wallet policy management module instructions are operable to manage said first local copy of said at least one electronic wallet profile and said at least one user profile.

5. The system of claim 1, further comprising: a second electronic device, comprising: a second host processor; and
a second secure execution environment coupled to said at least one second electronic device, said second secure execution environment being inaccessible to said second host processor and comprising at least one second memory, said at least one second memory comprising:
a second local copy of said at least one electronic wallet policy; a second local copy of said at least one user profile; and
synchronizing logic to synchronize said first and second local copies of said at least one electronic wallet policies and said first and second local copies of said at least one user profile.

6. The system of claim 5, wherein said synchronizing logic comprises cloud electronic wallet policy management (CEPM) instructions executed within at least one of said first secure execution environment and said second secure execution environment.

7. The system of claim 6, wherein said second electronic device is chosen from one or more network servers, one or more mobile electronic devices, and combinations thereof.

8. The system of claim 7, wherein:
said first electronic device and said second electronic device are both electronic wallet certified electronic devices;
said first local copy further comprises at least one copy of said electronic wallet;
said second local copy further comprises at least one copy of said electronic wallet; and
said synchronizing logic synchronizes said at least one copy of said electronic wallet in said at least one first local copy with said at least one copy of said electronic wallet in said at least one second local copy.

9. The system of claim 8, wherein said synchronizing logic comprises CEPM instructions executed within at least one of said at first secure execution environment and said second secure execution environment.

10. The system of claim 1, wherein said first electronic device is at least one electronic wallet certified device, the system further comprising:
an electronic wallet uncertified electronic device comprising a second host processor and a second secure execution environment coupled to the electronic wallet uncertified device;
wherein said at least one electronic wallet uncertified device comprises transaction logic to:
initiate an electronic wallet transaction with a transaction server;
receive electronic wallet information from said electronic wallet certified device; and
transmit said electronic wallet information to said transaction server.

11. The system of claim 10, wherein said first electronic device is chosen from an electronic wallet certified network server, an electronic wallet certified mobile electronic device, and combinations thereof.

12. The system of claim 10, wherein said transaction logic comprises multi device electronic wallet sharing module instructions executed within said second secure execution environment.

13. The system of claim 1, wherein said first electronic device is at least one electronic wallet certified device, the system further comprising:

an electronic wallet uncertified electronic device comprising a second host processor and a second secure execution environment coupled to said electronic wallet uncertified device;

wherein said electronic wallet uncertified device comprises initiation logic to:

initiate an electronic wallet transaction with a transaction server; and initiate communication between said at least one electronic wallet certified device and said transaction server, wherein said communication comprises at least one of transmitting electronic wallet information, at least one electronic wallet policy, and at least one user profile from said first electronic device to said transaction server.

14. The system of claim 13, wherein said first electronic device is chosen from an electronic wallet certified network server, an electronic wallet certified mobile electronic device, and combinations thereof.

15. The system of claim 14, wherein said initiation logic comprises remote invocation module instructions executed within said second secure execution environment.

* * * * *